United States Patent
Mandroux et al.

(10) Patent No.: US 9,494,698 B2
(45) Date of Patent: *Nov. 15, 2016

(54) METHOD AND DEVICE FOR MARINE SEISMIC ACQUISITION

(71) Applicant: CGG SERVICES SA, Massy (FR)

(72) Inventors: Fabrice Mandroux, Montrouge (FR); Jean-Pierre Degez, Massy (FR)

(73) Assignee: CGG SERVICES SA, Massy (FR)

(*) Notice: Subject to any disclaimer, the term of this patent is extended or adjusted under 35 U.S.C. 154(b) by 243 days.

This patent is subject to a terminal disclaimer.

(21) Appl. No.: 14/492,765

(22) Filed: Sep. 22, 2014

(65) Prior Publication Data

US 2015/0009779 A1   Jan. 8, 2015

Related U.S. Application Data

(63) Continuation of application No. 14/185,199, filed on Feb. 20, 2014, now Pat. No. 8,873,332, which is a continuation of application No. 13/469,376, filed on May 11, 2012, now Pat. No. 8,848,483.

(60) Provisional application No. 61/557,541, filed on Nov. 9, 2011.

(51) Int. Cl.
*G01V 1/38* (2006.01)
*G01V 1/02* (2006.01)

(52) U.S. Cl.
CPC ............ *G01V 1/02* (2013.01); *G01V 1/3808* (2013.01); *G01V 1/38* (2013.01); *G01V 1/3826* (2013.01)

(58) Field of Classification Search
CPC .............. G01V 1/38; G01V 1/3808; G01V 1/3826; G01V 1/02
See application file for complete search history.

(56) References Cited

U.S. PATENT DOCUMENTS

| | | |
|---|---|---|
| 7,400,552 B2 | 7/2008 | Moldoveanu et al. |
| 8,205,711 B2 | 6/2012 | Hopperstad et al. |
| 2003/0067842 A1 | 4/2003 | Sukup et al. |
| 2007/0230268 A1 | 10/2007 | Hoogeveen et al. |
| 2008/0267010 A1 | 10/2008 | Moldoveau et al. |
| 2008/0285381 A1 | 11/2008 | Moldoveanu et al. |
| 2009/0122640 A1 | 5/2009 | Hill et al. |
| 2010/0002538 A1 | 1/2010 | Frivik et al. |
| 2011/0158044 A1 | 6/2011 | Moldoveanu et al. |
| 2011/0199857 A1 | 8/2011 | Garden |
| 2012/0002503 A1 | 1/2012 | Janiszewski et al. |
| 2012/0033525 A1 | 2/2012 | Abma et al. |

(Continued)

FOREIGN PATENT DOCUMENTS

| | | |
|---|---|---|
| WO | 02/25315 A2 | 3/2002 |
| WO | 2009/092069 A1 | 7/2009 |
| WO | 2011/057324 A1 | 5/2011 |

*Primary Examiner* — Luke Ratcliffe
*Assistant Examiner* — Hovhannes Baghdasaryan
(74) *Attorney, Agent, or Firm* — Patent Portfolio Builders PLLC

(57) ABSTRACT

Method and system for improving offset/azimuth distribution. The system includes plural streamers towed by a streamer vessel; a central source towed by the streamer vessel; first and second front sources located in front of the plural streamers along a traveling direction of the streamer vessel; and first and second large offset front sources located in front of the first and second front sources along the traveling direction. The offset distance between the first and second large offset front sources, along a cross-line direction, is larger than an offset distance between the first and second front sources.

20 Claims, 8 Drawing Sheets

(56) References Cited

U.S. PATENT DOCUMENTS

2012/0092956 A1   4/2012   Soubaras

METHOD AND DEVICE FOR MARINE SEISMIC ACQUISITION

RELATED APPLICATION

The present application is a Continuation of U.S. patent application Ser. No. 14/185,199, filed Feb. 20, 2014, entitled "Method and Device for Marine Seismic Acquisition", which is a Continuation of U.S. patent application Ser. No. 13/469,376 filed on May 11, 2012, entitled "Method and Device for Marine Seismic Acquisition", which is related to, and claims priority from, U.S. Provisional Patent Application No. 61/557,541, filed on Nov. 9, 2011, entitled "Method and Device for Marine Seismic Acquisition", the entire contents of which are incorporated herein by reference.

BACKGROUND

1. Technical Field

Embodiments of the subject matter disclosed herein generally relate to methods and systems and, more particularly, to mechanisms and techniques for improved azimuth distribution in seismic data acquisition.

2. Discussion of the Background

Marine seismic data acquisition and processing generate a profile (image) of a geophysical structure (subsurface) under the seafloor. This profile does not necessarily provide an accurate location for oil and gas reservoirs, but it may suggest, to those trained in the field, the presence or absence of oil and/or gas reservoirs. Thus, providing a high-resolution image of the subsurface is an ongoing process.

For a seismic gathering process, as shown in FIG. 1, a data acquisition system 10 includes a vessel 12 towing plural streamers 14 that may extend over kilometers behind the vessel. One or more source arrays 16 may be also towed by the vessel 12 or another vessel for generating seismic waves. Conventionally, the source arrays 16 are placed in front of the streamers 14, considering a traveling direction of the vessel 12. The seismic waves generated by the source arrays propagate downward and penetrate the seafloor, eventually being reflected by a reflecting structure (not shown) back to the surface. The reflected seismic waves propagate upwardly and are detected by detectors provided on the streamers 14. However, such a method results in data having poor azimuth distribution.

An improvement to this conventional data acquisition method is the use of wide-azimuth (WAZ) acquisition. In a typical WAZ survey, two streamer vessels and multiple sources are used to cover a large sea area, and all sources and streamers are controlled at a uniform depth throughout the survey. WAZ acquisition provides better illumination of the substructure and, thus, a better final image. However, the presence of ghosts (e.g., reflections of waves from the surface of the water back to the receivers of the streamers) in the acquired data still affects the final image due to the presence of notches.

A newer approach, rich-azimuth (RAZ) acquisition, shows promising signs for improving the final image. RAZ acquisition is the combination of multi-azimuth acquisition and wide-azimuth geometry. RAZ acquisition may be implemented by shooting a same cell in three directions, e.g., 30°, 90°, and 150°, each direction being shot in one or two passes. A rose diagram for such a rich-azimuth survey shows the benefits of rich-azimuth towed-streamer acquisition, i.e., azimuth coverage from 0° to 360° and uniform offset distribution from 400 m to 8000 m for a 8000 m long streamer.

However, the existing RAZ acquisition can further be improved to increase the illumination and accuracy of the final image by finding an appropriate number and distribution of source arrays to achieve ultra long offset together with broadband techniques. Accordingly, it would be desirable to provide systems and methods that avoid the aforedescribed problems and drawbacks, and improve the accuracy of the final image.

SUMMARY

According to an exemplary embodiment, there is a survey acquisition system that includes plural streamers towed by a streamer vessel; a central source towed by the streamer vessel; first and second front sources located in front of the plural streamers along a traveling direction of the streamer vessel; and first and second large offset front sources located in front of the first and second front sources along the traveling direction. An offset distance between the first and second large offset front sources, along a cross-line direction (Y), is larger than an offset distance between the first and second front sources.

According to another exemplary embodiment, there is a survey acquisition system that includes plural streamers towed by a streamer vessel; a central source towed by the streamer vessel; first and second front sources located in front of the plural streamers along a traveling direction of the streamer vessel; and first and second large offset front sources located in front of the first and second front sources along the traveling direction. An offset distance between the second large offset front source and the traveling distance, along a cross-line direction (Y), is larger than an offset distance between the first front source and the traveling distance. The offset distance between the second large offset front source and the traveling distance, along a cross-line direction (Y), is larger than an offset distance between the second front source and the traveling distance.

According to still another exemplary embodiment, there is a method for seismic data acquisition that includes towing plural streamers with a streamer vessel; towing a central source with the streamer vessel; towing first and second front sources, located in front of the plural streamers along a traveling direction of the streamer vessel, with corresponding front towing vessels; and towing first and second large offset front sources, located in front of the first and second front sources along the traveling direction, with corresponding large offset front towing vessels. The first and second front sources, the central source and the first and second large offset front sources are actuating simultaneously or sequentially during the survey.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of RAZ acquisition using a vessel streamer and five sources. However, the embodiments to be discussed next are not limited to these configurations, but may be extended to other arrangements as discussed later.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, a system configuration for enriching RAZ acquisition includes a streamer vessel configured to tow plural streamers and a source array and plural source vessels configured to tow one or more source arrays. Two source vessels may be configured to sail parallel to the streamer vessel, substantially at a same position along a traveling direction of the streamer vessel. Two other source vessels are configured to sail either in front of the streamer vessel or behind the streamers of the streamer vessel. In one application, two source vessels (front source vessels) are provided ahead of the streamers, e.g., next to the streamer vessel while the other two source vessels (large offset source vessels) are provided further ahead of the streamer vessel along the traveling direction.

According to another exemplary embodiment, the large offset source vessels may be provided with a larger cross-line separation than the front source vessels. In still another exemplary embodiment, the large offset source vessels may be provided symmetrically or asymmetrically relative to the traveling direction. In yet another exemplary embodiment the streamers may be provided to have a dovetail-like (fan) arrangement. According to still another exemplary embodiment, the streamers may have a variable depth along as described, for example, in patent application Ser. No. 13/272,428, entitled "Method and Device to Acquire Marine Seismic Data," and authored by R. Soubaras, the entire content of which is incorporated herein by reference. Still, in another application, no two source arrays are at the same inline position along the traveling direction. These embodiments are now discussed in more detail below.

Figure 1:
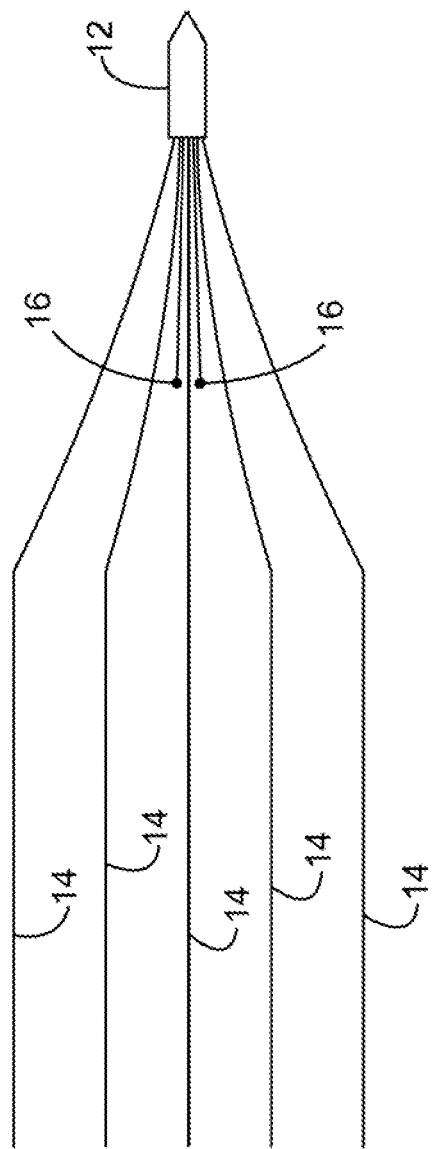
FIG. 1 is a schematic diagram of a conventional seismic data acquisition system.
Figure 2:
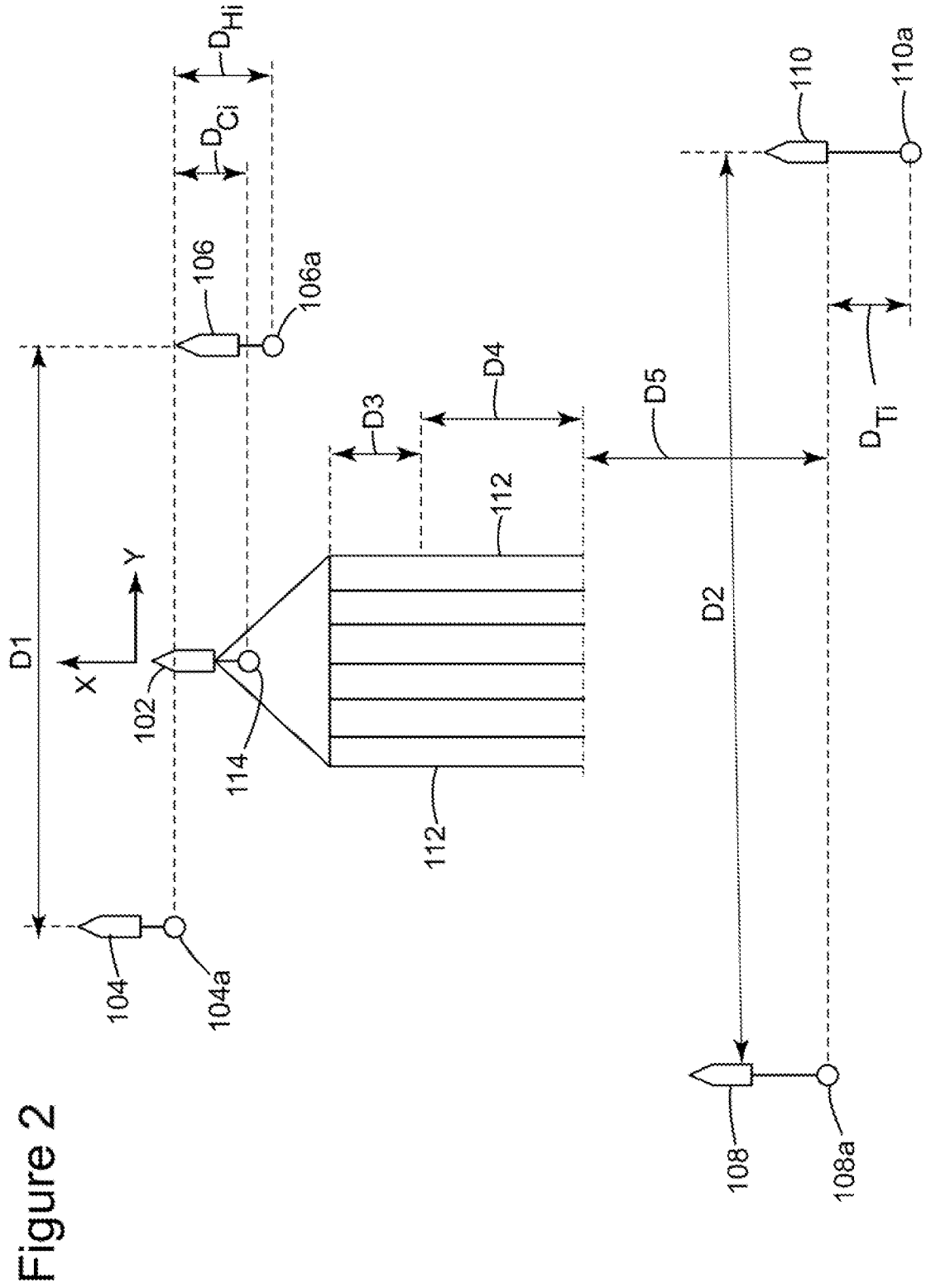
FIG. 2 is a schematic diagram of a novel seismic data acquisition system according to an exemplary embodiment.
Figure 3:
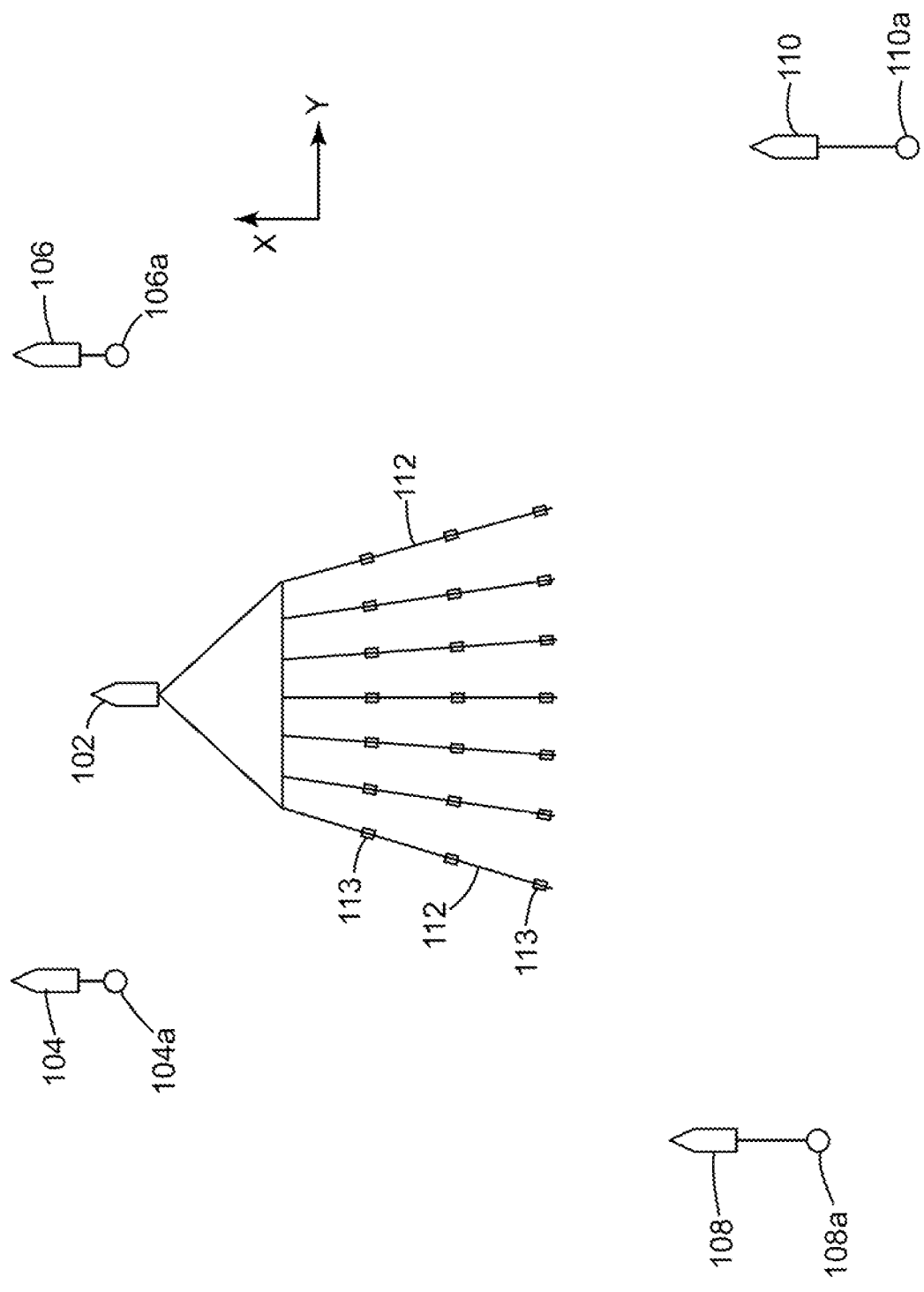
FIG. 3 is a schematic diagram of another novel seismic data acquisition system according to an exemplary embodiment.

According to an exemplary embodiment illustrated in FIG. 2, there is a seismic acquisition system 100 that includes a streamer vessel 102 and four source vessels 104, 106, 108 and 110. The streamer vessel 102 tows plural streamers 112 and, optionally, a source array 114. The source vessels tow corresponding source arrays 104a, 106a, 108a, and 110a. The source arrays may include one or more individual sources. An individual source may be, for example, an air gun. The streamers 112 are substantially parallel in this embodiment. However, as shown in FIG. 3, the streamers 112 may be distributed in a dovetail-like shape. In one application, the streamers 112 are fanned in a horizontal plane (substantially parallel to the water surface) so that they make an angle with each other. To achieve this arrangement, birds 113 may be located on each streamer 112 as shown in FIG. 3, for maintaining the streamers at the desired positions. The birds are devices capable of maintaining a vertical and/or horizontal position in water.

Returning to FIG. 2, it is noted that the X axis corresponds to the traveling direction of the vessels, also known in the art as the inline, and the Y axis, which is perpendicular to X axis, is known in the art as the cross-line. With this convention, a cross-line distance D1 between sources 104a and 106a (front sources) may be approximately 1200 m while a cross-line distance D2 between sources 108a and 110a (tail sources) may be approximately 2400 m. A central source 114 may be placed at half distance between the front sources. These numbers are exemplary and not intended to limit the exemplary embodiments. However, a characteristic of this exemplary embodiment is that the separation distance between the tail sources is larger than the separation distance between the front sources. In one application, the separation distance between the tail sources is substantially double the separation distance of the front sources.

Another characteristic of this exemplary embodiment is the inline distance between the sources. Considering the front sources 104a and 106a, it is noted that there is an inline displacement $D_{HF}$ between them. The central source 114 may also be displaced inline (e.g., $D_{Cf}$) relative to one of the front sources. A similar inline displacement $D_{TT}$ may be implemented for the tail sources 108a and 110a. The values for these inline displacements vary from survey to survey, depending on various factors such as, for example, length of streamers, number of streamers, depth of sea bottom, etc.

Figure 4:
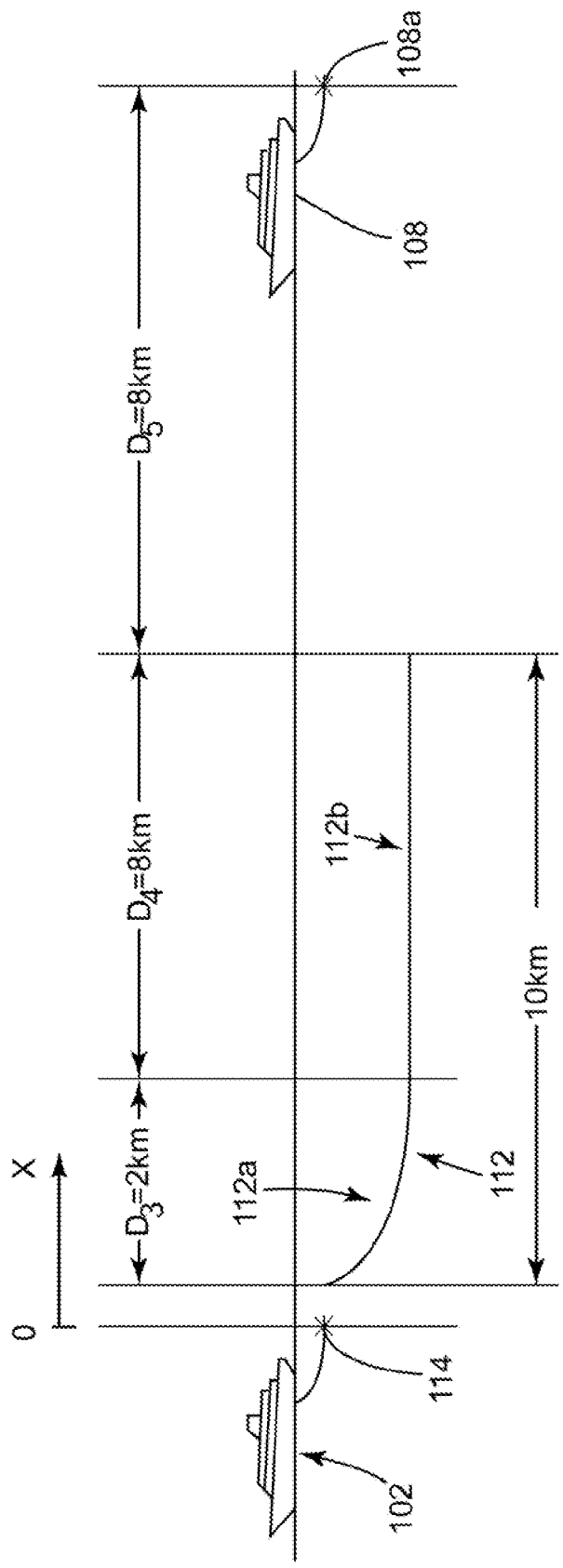
FIG. 4 is a schematic diagram of a curved streamer and a large offset source vessel according to an exemplary embodiment.

The streamers 112 may be towed to be substantially parallel or slanted to the water surface. As shown in FIG. 2, the streamers may have a length D3+D4 (to be explained later) and an offset between an end of the streamer and the tail source 108a is D5. In one application, the streamers may have a curved profile, as shown in FIG. 4 (e.g., Broadseis configuration originated by CGGVeritas, France). Supposing that the streamer 112 shown in FIG. 4 has a length of, for example, 10 km, the curved portion 112a may have a length D3=2 km and the flat portion 112b may have a length D4=8 km. For these specific values, an offset of the tail source 108a relative to an end of the streamer (along the X axis) is about D5=8 km, i.e., substantially equal to the flat portion of the streamer. This is considered a large offset in the industry. As disclosed in various patent applications of CGGVeritas, lengths of the curved portion and the flat portion differ from survey to survey and, thus, the numbers disclosed in this embodiment are exemplary. Moreover, such embodiments do not require a linkage between the source position and the flat portion of the streamer. For example, the configuration of FIG. 2 can also be applied to embodiments where one or more streamers do not have flat portions and the same source positions as shown in FIG. 2 may still be implemented in the overall configuration.

For a 10 km long streamer with a flat portion of 8 km, it is expected that the tail source should be 8 km away from the end of the streamer to avoid having shallow tow data in the long offset gathers when using the Broadseis method. Further, this offset also allows for feather variations to be minimized.

The five sources may be fired using various schemes. One scheme is to shoot the sources sequentially, for example, at 37.5 m intervals (i.e., shoot a first front source, wait for the first front source to travel 37.5 m along the X axis, and then shoot the central source, and so on). The value of 37.5 m is exemplary and is based on the traveling speed of the streamer vessel. In this way, the sources are fired when they have the same inline position during a firing sequence. A firing sequence includes the sequential firing of each source once. Another scheme is to shoot the sources almost instantaneously, with random time delays. It is noted that for a 20 km offset, the tail sources need to be shot until the end of the full-fold boundary. Still another scheme is to shoot the sources at the same times.

Figure 5:
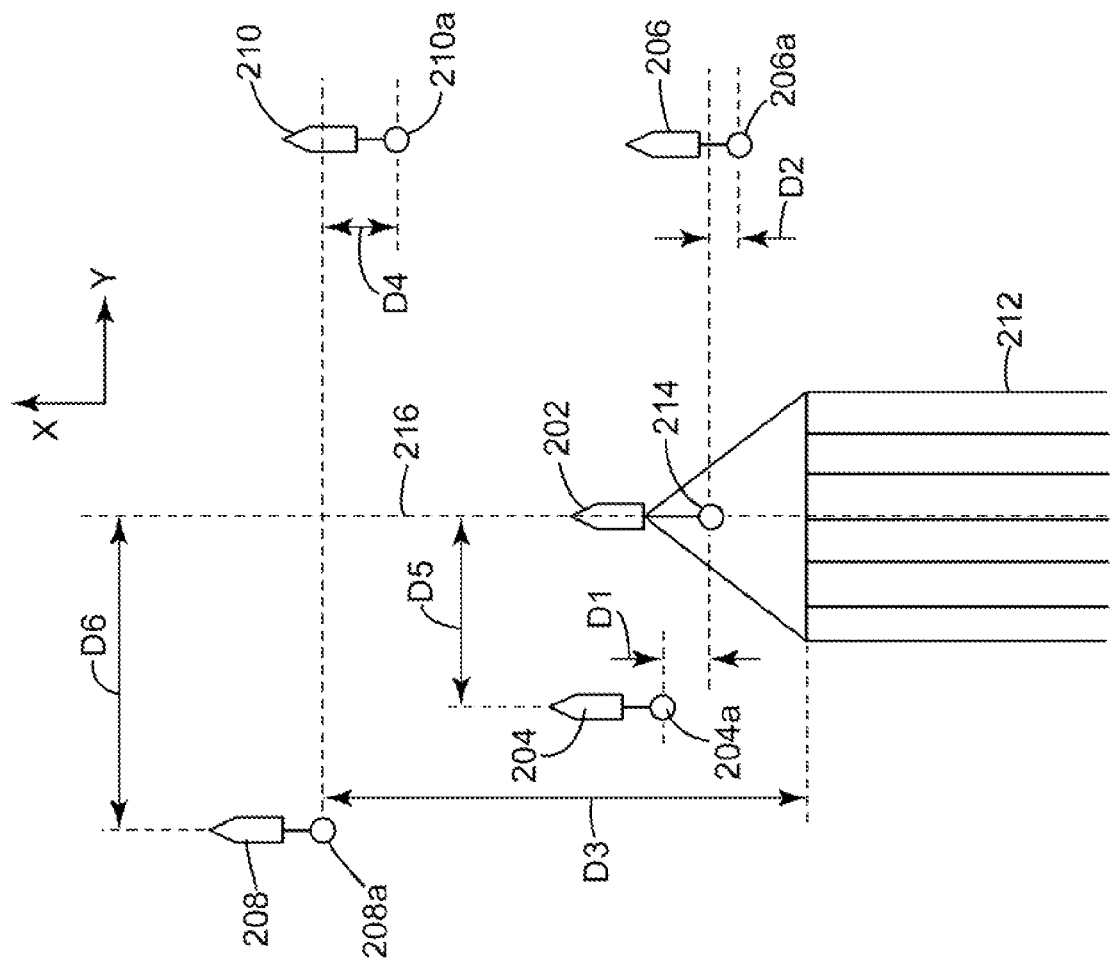
FIG. 5 is a schematic diagram of a seismic data acquisition system having plural source vessels in front of streamers according to an exemplary embodiment.

According to another exemplary embodiment illustrated in FIG. 5, a seismic system 200 includes a streamer vessel 202 and four source vessels 204, 206, 208, and 210. In one application, less or more source vessels may be used. The streamer vessel 202 is configured to tow plural streamers 212, which may be substantially parallel to each other or having a dovetail configuration, as shown in FIG. 3. The streamer vessel 202 may also be configured to tow a source 214 along a traveling direction 216.

Two (204 and 206) of the four source vessels are configured to move substantially in parallel with the streamer vessel 202. These two source vessels (front source vessels) are located in front of the streamers 212. Each of the front source vessel 204 and 206 is configured to tow at least a front source (204a or 206a) that is also positioned in front of the streamers 212. Sources 214, 204a and 206a may be located to have the same in-line coordinate (i.e., same value on X axis). In another application, which is illustrated in FIG. 5, the front source 204a is ahead of the source 214 by a distance D1 and the source 214 is ahead of the front source 206a by a distance D2. In one application, D1 may be equal with D2.

Source vessels 208 and 210 (called herein "large offset front sources" as an offset distance between them is large, e.g., 2.4 km) may be located in front of the vessels 202, 204 and 206 and each of these source vessels may tow at least one source 208a or 210a. In one application, a distance D3 between (i) the large offset front sources 208a and 210a and (ii) the front sources 204a and 206a is in the order of kms, for example, 2 to 10 km. Of course, smaller or larger offsets are also possible depending on the characteristics of the survey. In one application, the large offset front sources 208a and 210a are separated by an inline distance D4, which may have a value of zero to hundreds of meters.

The configuration shown in FIG. 5 has the four sources 204a, 206a, 208a and 210a disposed symmetrically relative to the traveling direction 216. Further, a half cross-line separation between the front sources 204a and 206a and the traveling distance 216 is D5 and a half cross-line separation between the large offset front sources 208s and 210a and the traveling distance 216 is D6, which is larger than D5. In one application, D5 is about 1200 m and D6 is about 2400 m. For this exemplary embodiment, the streamers 212 may be 10 km long and inline separated by about 100 m. In one application, the plurality of streamers 212 includes 10 streamers.

Figure 6:
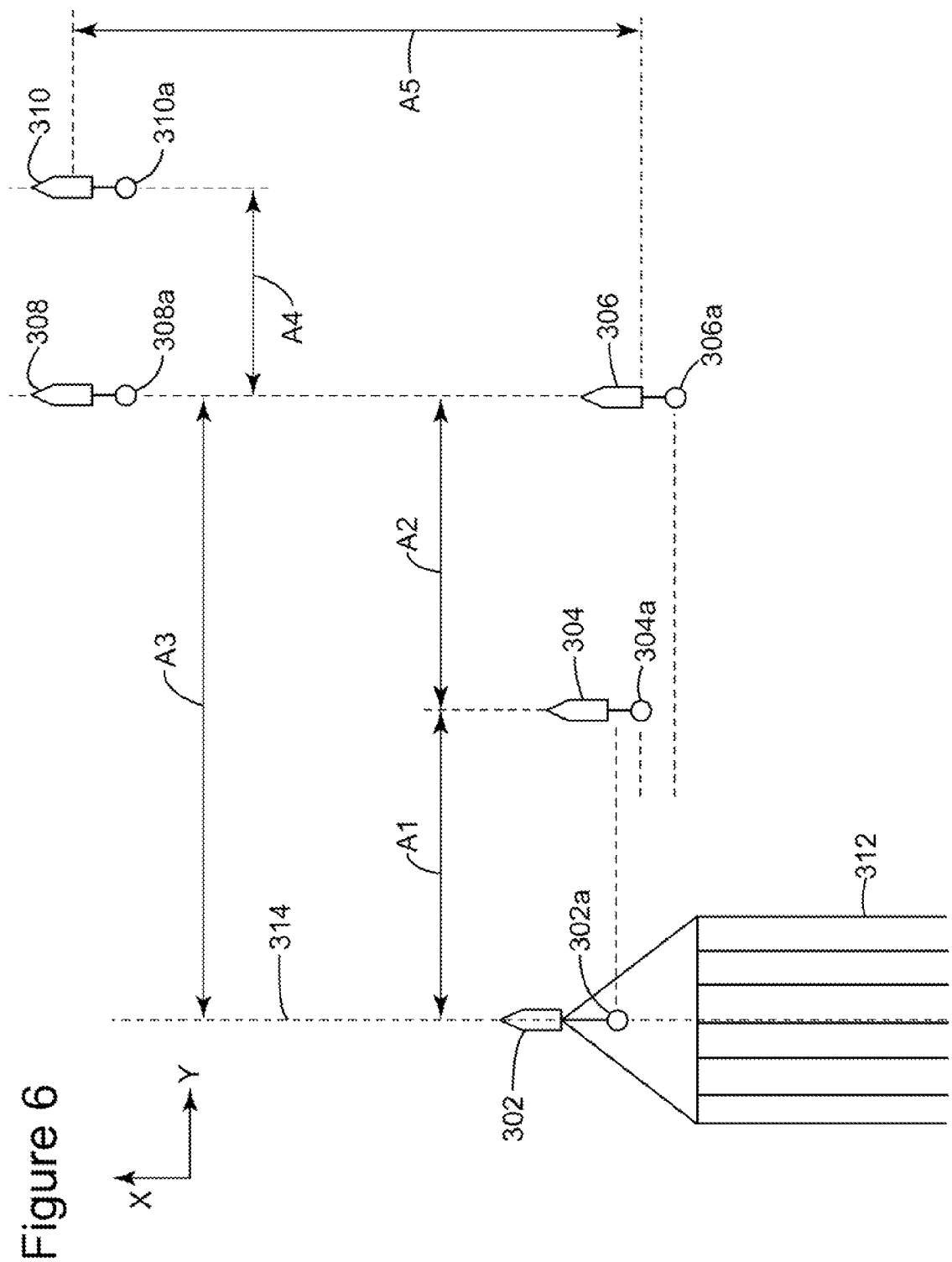
FIG. 6 is a schematic diagram of a seismic data acquisition system having plural source vessels in front of streamers and asymmetric located according to an exemplary embodiment.

According to still another exemplary embodiment illustrated in FIG. 6, there is a seismic system 300 that includes a streamer vessel 302 and four source vessels 304, 306, 308 and 310. More or less source vessels may be used. Each of the vessels may tow a corresponding seismic source 302a, 304a, 306a, 308a and 310a and the streamer vessel 302 also tows a plurality of streamers 312. The streamers configuration may be similar to the embodiment disclosed in FIG. 5. Further, the streamers shown in FIGS. 5 and 6 may have the configuration shown in FIGS. 3 and/or 4. In this embodiment, the front sources 304a and 306a are disposed on a same side of the streamer vessel 302 relative to the traveling direction 314, the front source vessel 304 being separated by a cross-line distance A1 from the streamer vessel 302 and the front source vessel 306 being separated by a cross-line distance A1+A2 from the streamer vessel 302. In one application, each of the cross-line distances A1 and A2 may be around 1200 m. The large offset source vessels 308 and 310 may also be provided on the same side of the streamer vessel 302 relative to the traveling direction 314, similar to the front sources 304 and 306. In this exemplary embodiment, a cross-line distance between the traveling direction 314 and the large offset vessel 308 is A3 and a cross-line distance between the traveling direction 314 and the large offset vessel 310 is A3+A4. In one application, the distance A3 is about 2400 m.

In another application, the front sources 304 and 306 may be located on one side of the traveling path 314 while the large offset front sources may be located on the other side of the traveling path 314. In still another application, an inline distance A5 between the front sources and the large offset front sources is in the order of kms. Similar to the embodiment illustrated in FIG. 5, the front and large offset front sources may be separated along the traveling direction by predetermined distances and these distances may be the same or different.

In one exemplary embodiment, an inline distance between the first front source 304a and the central source 302a is equal to an inline distance between the first front source 304a and the second front source 306a and this inline distance is equal to an inline distance between the first large offset front source 308a and the second large offset front source 310a. This configuration may be applied to any of the embodiments illustrated in FIGS. 5 and 6. It is also noted that a large offset between a source and a traveling distance is considered in the industry to be equal to or larger than 2 km. Further, it is noted that the first and second front sources, the central source and the first and second large offset front sources may be actuated simultaneously or sequentially during the survey for both embodiments of FIGS. 5 and 6.

Figure 7:
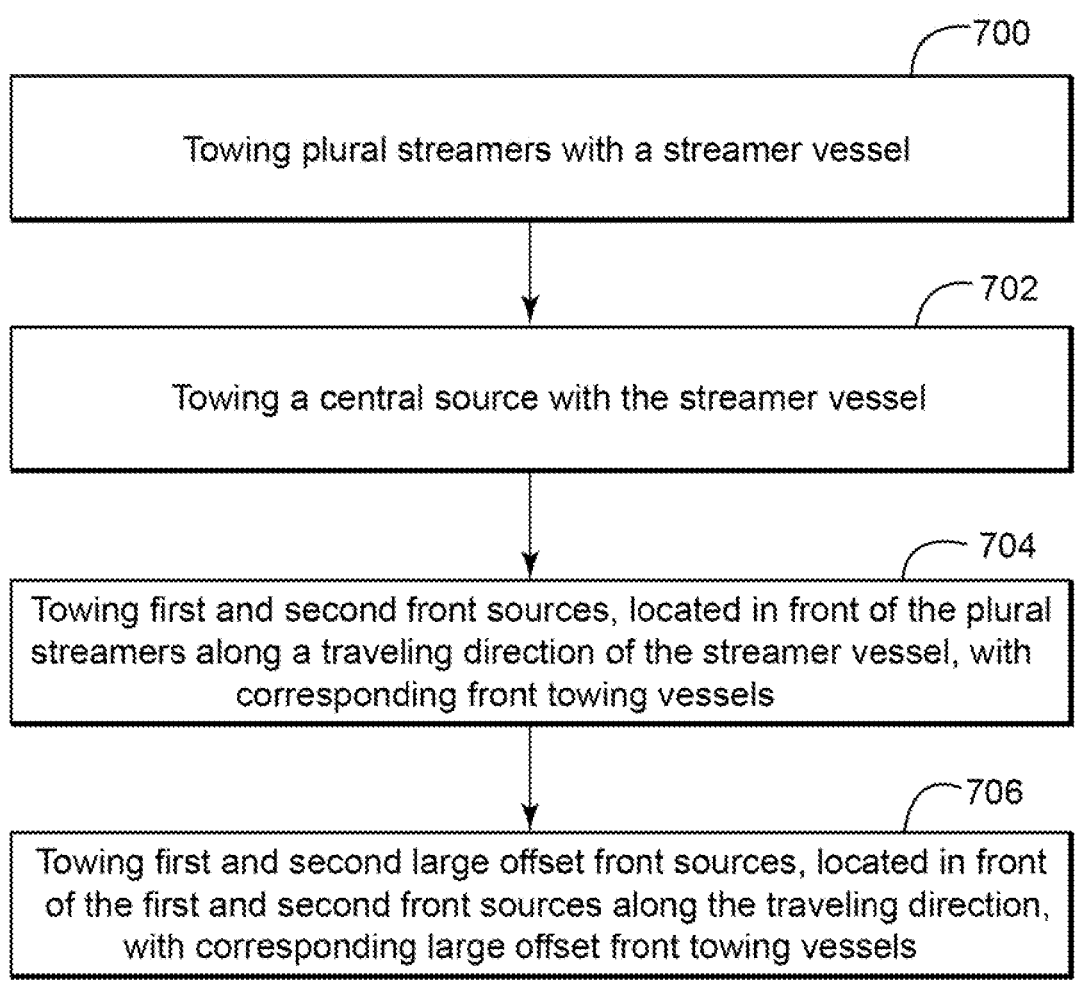
FIG. 7 is a flowchart of a method for towing multiple sources with multiple vessels according to an exemplary embodiment.

Having discussed the novel configurations for seismic data acquisition, a method for implementing the seismic data acquisition is now discussed in the following embodiments. According to an exemplary embodiment illustrated in FIG. 7, there is a method for seismic data acquisition that includes a step 700 of towing plural streamers 212 with a streamer vessel 202; a step 702 of towing a central source 214 with the streamer vessel 202; a step 704 of towing first and second front sources 204a, 206a, located in front of the plural streamers 212 along a traveling direction 216 of the streamer vessel 202, with corresponding front towing vessels; and a step 706 of towing first and second large offset front sources 208a, 210a, located in front of the first and second front sources 204*a*, 206*a* along the traveling direction 216, with corresponding large offset front towing vessels. The first and second front sources, the central source and the first and second large offset front sources are actuating simultaneously or sequentially during the survey.

Figure 8:
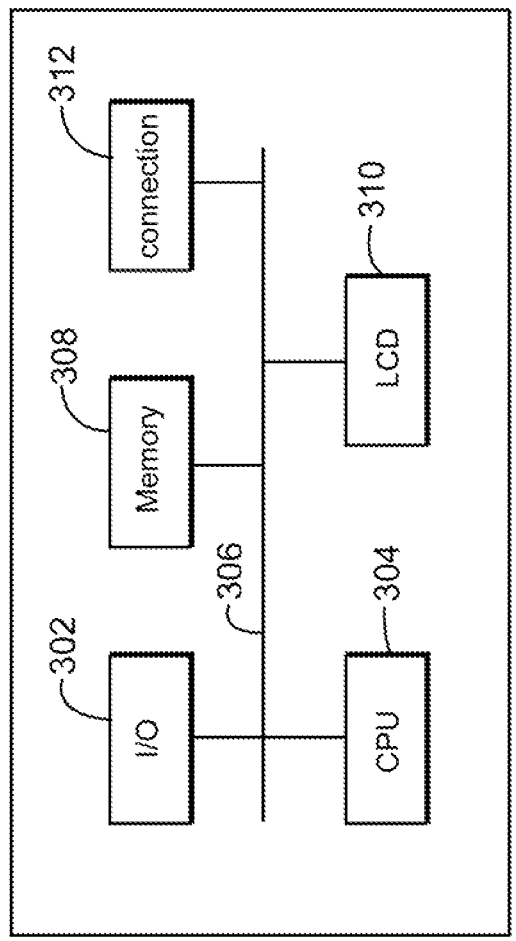
FIG. 8 is a schematic diagram of a computerized system that implements various methods according to an exemplary embodiment.

One or more of the methods discussed above may be implemented in a computerized system as shown in FIG. 8. Such a computerized system 300 may receive, via the input/output interface 302, information pertinent to positions of the sources and/or streamers, the arc angle, the turning radius, the run-in length, the run-out length, etc. In addition, the computerized system 300 may include a processor 304 for processing the above-noted data and for calculating, for example, the size of a cell. The interface 302 and the processor 304 are connected to a bus 306. Further, the computerized system 300 may include a memory 306 to store the above-noted data, a display 310, a connection 312 to the streamers and/or the sources, and other elements common for a computerized system or server as would be recognized by those skilled in the art.

The above-disclosed exemplary embodiments provide a system and a method for improving azimuth distribution for seismic data acquisition. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

For example, although the embodiments illustrated above in FIGS. 2, 5 and 6 depict streamers arranged substantially parallel to one another, other streamer configurations may be employed in any of these embodiments. For example, the streamers may be distributed in a dovetail-like shape in any of these embodiments. In one application, the streamers are fanned in a horizontal plane (substantially parallel to the water surface) so that they make an angle with each other. To achieve this arrangement, birds may be located on each streamer as shown in FIG. 3, for maintaining the streamers at the desired positions. The birds are devices capable of maintaining a vertical and/or horizontal position in water. According to other embodiments, one or more of the streamers may include a curved portion, or may be entirely curved, as opposed to the illustrated straight streamers in FIGS. 2, 5 and 6. Other streamer geometries may also be used in accordance with the positioning of seismic acquisition elements shown in any of these various embodiments. Although the features and elements of the present exemplary embodiments are described in the embodiments in particular combinations, each feature or element can be used alone without the other features and elements of the embodiments or in various combinations with or without other features and elements disclosed herein. Further, it is noted that the above embodiments may be implemented in software, hardware or a combination thereof.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for acquiring seismic data, the method comprising:

towing, with a vessel, plural streamers and a first source array along an inline direction;

towing, with second and third vessels, second and third source arrays, respectively, the second and third vessels being located at different cross-line positions relative to the first vessel along a cross-line direction, wherein the cross-line direction is substantially perpendicular to the inline direction and in a water plane; and towing, with fourth and fifth vessels, fourth and fifth source arrays, respectively, the first to fifth vessels being located in front of a rear portion of the plural streamers along the inline direction, wherein an offset distance between the fourth and fifth vessels along the cross-line direction is larger than an offset distance between the second and third vessels, and wherein at least one of the second and third vessels has a different inline position than at least one of the fourth and fifth vessels.

2. The method of claim 1, wherein the first source and one of the second and third sources are offset by a predetermined first distance along the inline direction.

3. The method of claim 2, wherein the fourth and fifth sources are offset from each other by a predetermined second distance along the inline direction.

4. The method of claim 1, wherein the fourth and fifth sources are located in front of the second and third sources along the inline direction.

5. The method of claim 1, wherein the plural streamers are fanned out so that two adjacent streamers make with each other an angle larger than 0.2 degree.

6. The method of claim 1, wherein at least a streamer of the plural streamers has a curved portion in a vertical plane.

7. The method of claim 1, wherein the second and third sources are separated by a given inline offset.

8. A method for acquiring seismic data, the method comprising:

towing, with a first vessel, a first seismic source and plural streamers along an inline direction;

towing, with second and third vessels, second and third seismic sources, respectively, along the inline direction and having respective second and third cross-line offsets relative to the first vessel along a cross-line direction, wherein the cross-line direction is substantially perpendicular to the inline direction and in a water plane; and towing, with fourth and fifth vessels, fourth and fifth seismic sources, respectively, along the inline direction in front of the first, second and third vessels, and having respective fourth and fifth cross-line offsets relative to the first vessel, wherein the first to third vessels travel in front of a rear portion of the plural streamers, and wherein at least one of the second and third vessels has a different inline position than at least one of the fourth and fifth vessels.

9. The method of claim 8, wherein a sum of the fourth and fifth cross-line offsets is larger than a sum of the second and third cross-line offsets.

10. The method of claim 8, wherein at least one of the second and third vessels travels in front of the first vessel along the inline direction.

11. The method of claim 8, wherein the second and the fourth vessels travel on one side of the first vessel relative to the inline direction and the third and the fifth vessels travel on the other side of the first vessel relative to the inline direction.

12. The method of claim 8, wherein the second and the third vessels are sandwiched between the fourth and fifth vessels along the cross-line direction.

13. The method of claim 8, wherein at least two sources of the first to fifth sources are staggered relative to the inline direction.

14. The method of claim 8, wherein the first vessel is configured to tow a first plurality of streamers.

15. The method of claim 14, wherein one of the second and third vessels is configured to tow a second plurality of streamers.

16. The method of claim 8, wherein the first to fifth sources include air guns.

17. The method of claim 8, wherein the first to fifth sources include marine vibrators.

18. A method for acquiring seismic data, the method comprising:
  towing, with first to fifth seismic vessels, corresponding first to fifth seismic sources, wherein, in a system of axes including an inline direction and a cross-line direction, which are substantially perpendicular to each other, and which form a plane substantially parallel to the water surface, each vessel has a different cross-line position;
  setting a cross-line distance between the second and third vessels to be less than a cross-line distance between the fourth and fifth vessels;
  positioning the first to fifth vessels to travel ahead of a rear portion of plural streamers towed along the inline direction; and
  selecting at least one of the second and third vessels to have a different inline position than at least one of the fourth and fifth vessels.

19. The method of claim 18, wherein at least two seismic sources of the first to fifth sources have different inline positions.

20. The method of claim 18, wherein each seismic source has a different inline position.

* * * * *